United States Patent [19]
Matthews

[11] Patent Number: 5,209,614
[45] Date of Patent: May 11, 1993

[54] TEMPLATE POSITIONING JIG

[75] Inventor: Thomas E. Matthews, Lilburn, Ga.

[73] Assignee: Kawneer Company, Norcross, Ga.

[21] Appl. No.: 769,328

[22] Filed: Sep. 30, 1991

Related U.S. Application Data

[63] Continuation of Ser. No. 326,602, Mar. 21, 1989, abandoned.

[51] Int. Cl.⁵ .................................................. B23B 49/02
[52] U.S. Cl. ..................................... 408/1 R; 408/79;
408/103; 408/115 R
[58] Field of Search ............... 409/219; 408/72 R, 79,
408/115 R, 115 B, 241 B, 1 R, 97, 103;
269/48.1; 144/144.5, 253; 294/93; 83/821;
248/500, 507

[56] References Cited

U.S. PATENT DOCUMENTS

| 2,412,459 | 12/1946 | Stull | 408/79 |
| 2,563,994 | 8/1951 | Dougherty | 279/1 Q |
| 2,682,181 | 6/1954 | Toth et al. | 408/82 |
| 2,825,143 | 3/1958 | Polivka | 408/72 X |
| 2,864,268 | 12/1958 | Anderson | 408/79 |
| 2,922,656 | 1/1960 | Belloli | 279/15 |
| 4,011,024 | 3/1977 | Nakano et al. | 408/111 |
| 4,659,126 | 4/1987 | Breck et al. | 269/48.1 X |

Primary Examiner—Daniel W. Howell
Attorney, Agent, or Firm—Jones & Askew

[57] ABSTRACT

An template positioning jig. In a preferred embodiment, a deformable member is used which is deformed inwardly along a first axis such that it bulges or otherwise deforms outwardly along a second axis, until contacting the sides of a cavity, whereupon it tends to center itself within the cavity. An operably associated template is likewise centered or otherwise positioned as desired relative to the cavity.

15 Claims, 4 Drawing Sheets

TEMPLATE POSITIONING JIG

This is a continuation of application Ser. No. 326,602, filed Mar. 21, 1989, now abandoned.

TECHNICAL FIELD

The present invention relates to a tool guiding apparatus and more particularly relates to an improved drilling template positioning jig.

BACKGROUND OF THE INVENTION

In the manufacture of members having an aperture therein, it is often desired to drill holes in the members, such that the holes are positioned at desired positions relative to the aperture, within acceptable tolerances. It is known to accomplish such manufacturing processes by the use of drilling templates, which are positioned as desired relative to the aperture prior to the drilling operation. It may be understood that accurate positioning of a template relative to an aperture correspondingly results in accurate positioning of the drilled holes relative to the aperture.

It is known in the art to provide tool guiding fixtures, or "jigs", which may be used to position a template as desired relative to a particular aperture. U.S. Pat. No. 2,412,459 to Stull, entitled "TOOL GUIDING FIXTURE" discloses a tool guiding fixture including a template 10, a thumbscrew driven cam member 21 and plunger-like members 32 (see FIG. 3). As the thumbscrew is tightened, cam member 21 is urged upwardly, forcing plunger members 32 outwardly. The plunger members likewise force fingers 38 outwardly and against the inside walls 14 of tubular part 13 such that template 10 is positioned as desired.

Figure 6:
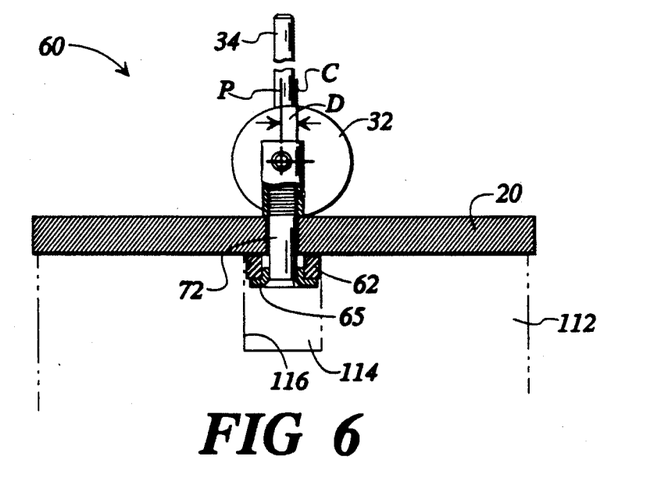
FIG. 6 is a side partial cutaway view of a second embodiment of a template positioning jig according to the present invention, with the jig shown atop a typical channel member, shown in phantom. This figure shows the jig in a disengaged position.

U.S. Pat. No. 2,825,143 to Polivka, entitled "TEMPLATE CENTERING JIG" discloses a template centering jig including a template 10 which is centered along two perpendicular axes within a rectangular opening provided by tubing 42. Referring to FIG. 6, centering along the first axis is provided by threaded member 22 which, when tightened, urges actuating pin 34 downwardly, causing locating members 28 and 29 of the centering pin 26 to move apart and outwardly until they engage the inner walls 40 and 41 of the tubing 42. Centering along the second axis is provided by a threaded member 24 (see FIG. 4) which, when tightened, urges actuating a pin 56 downwardly, to urge member 53 and a similarly-shaped unnumbered member outwardly and against the walls of the tubing 42.

Although the methods and apparatuses described in these patents do provide adequate template positioning under certain conditions, they also possess several different disadvantages in that they tend to be relatively complex, and therefore expensive, and also may tend to mar the use of softer metals due to metal-to-metal contact during operation. They may also be relatively difficult to quickly engage and disengage during operation, resulting in disadvantageously excessive labor costs during use.

Therefore, a need has been realized to provide an improved template positioning jig which may be easily operated under a variety of conditions, does not tend to mar the surfaces of the material being processed and may be quickly engaged and disengaged. As always, a need exists to make such devices economical to produce and operate.

SUMMARY OF THE INVENTION

The present invention solves the above-described problems in the prior art by providing an improved template positioning jig construction. A template positioning jig according to the present invention includes the use of at least one deformable element, which when deformed inwardly along a first axis, expands along a second axis. If the deformable element is placed within an aperture or cavity defined at least in part by two cofacing sides, the element may expand to contact both surfaces and tend to seek a desired position between the surfaces. A template, being another component of the jig and operably associated with the deformable element, correspondingly seeks a desired position relative to the cavity. The jig uses a relatively small number of inexpensive moving parts, does not tend to mar the material being processed and is lever operated for quick engagement and disengagement.

Generally described, the present invention comprises a deformable member, and means for deforming the deformable member inwardly along a first axis such that the deformable member expands outwardly along a second axis.

More particularly described, the present invention comprises a base member defining a base surface, a force exerting member defining a force exerting surface, a deformable member positioned between the base member and the force exerting member, the deformable member being in contact with the base surface and the force exerting surface, and means for urging the force member relatively toward the base member along a first axis, when the deformable member is in the cavity, such that the deformable member is deformed outwardly along a second axis.

Thus, it is an object of the present invention to provide an improved construction for a template positioning jig.

It is a further object of the present invention to provide an improved template positioning jig that is easy to operate.

It is a further object of the present invention to provide an improved template positioning jig which does not tend to mar the surface of the material which it contacts.

It is a further object of the present invention to provide an improved template positioning jig that includes a minimum of parts, each of which may be readily replaced if necessary.

It is a further object of the present invention to provide an improved template positioning jig which may be altered for use with elements having different channel widths.

Other objects, features and advantages of the present invention will become apparent from reading the following specification when taken in conjunction with the accompanying drawings.

DETAILED DESCRIPTION OF THE PREFERRED EMBODIMENT

For purposes of effective explanation, reference may be made herein to "upper", "lower", "horizontal", "vertical", "inside", "outside", etc., portions of various elements throughout this description. It should be understood that such references are merely relative terms and are made only in reference to the orientation of the embodiments shown in the accompanying figures. It is imperative to note that the preferred embodiments of the present invention may be used in a wide variety of orientations, and not only the orientation illustrated in the accompanying drawings.

Figure 1:
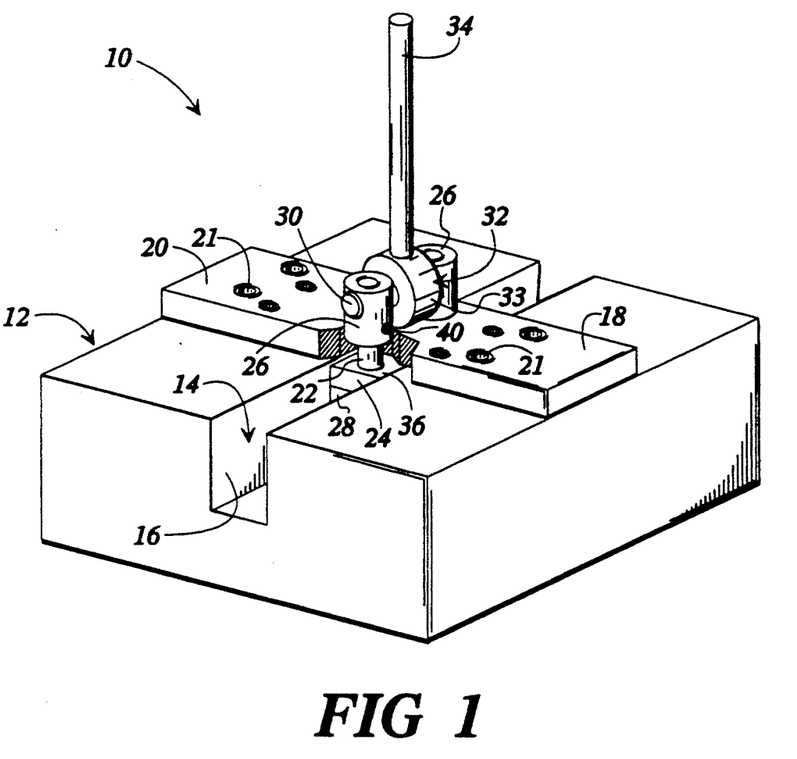
FIG. 1 is an upper perspective view of a first preferred embodiment of a template positioning jig according to the present invention, as used with a typical channel framing member defining a channel.
Figure 2:
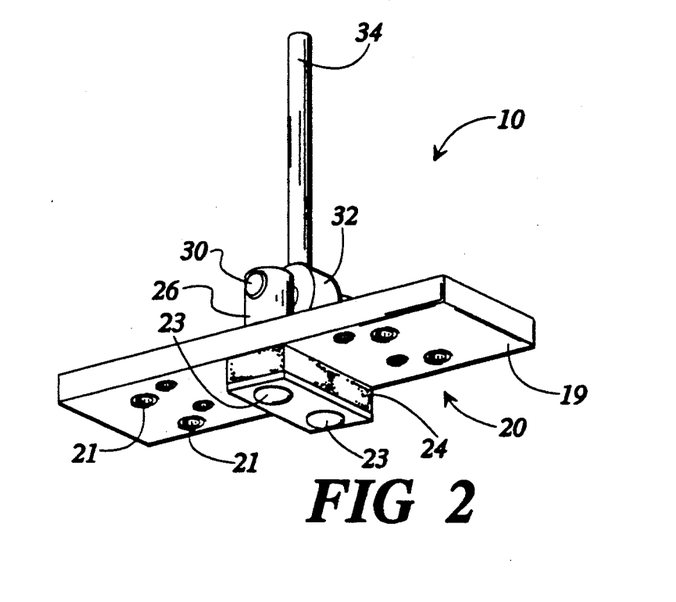
FIG. 2 is a lower perspective isolated view of the embodiment of the template positioning jig shown in FIG. 1.

Referring now in more detail to the drawings, in which like numerals indicate like parts throughout the several views, FIG. 1 shows a template positioning jig 10 according to a first preferred embodiment of the invention, positioned in place atop a typical channel member 12 defining an elongate channel 14 defined in part by interior vertical cofacing sides 16. The template positioning jig 10 includes a base which also serves as a template, hereinafter referred to as template 20, and also includes headed compression members 22, a deformable member 24, sleeve connectors 26, a plate 28, a pivot shaft 30, a cam 32, and an operating lever 34.

Figure 3:
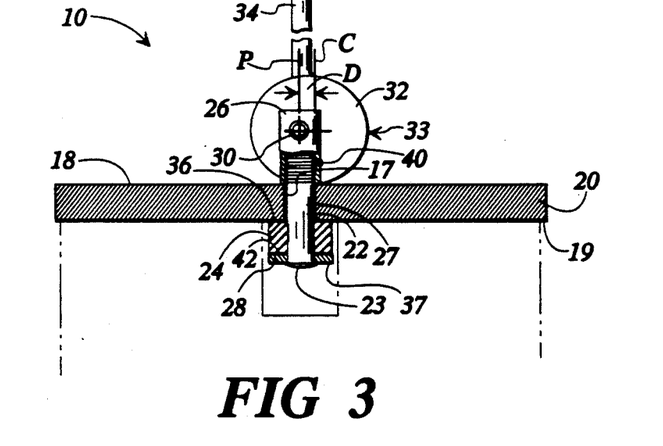
FIG. 3 is a side partial cutaway view of the embodiment of the template positioning jig shown in FIGS. 1 and 2, as used with a typical channel member shown in phantom. This figure shows the template positioning jig in a disengaged position.
Figure 4:
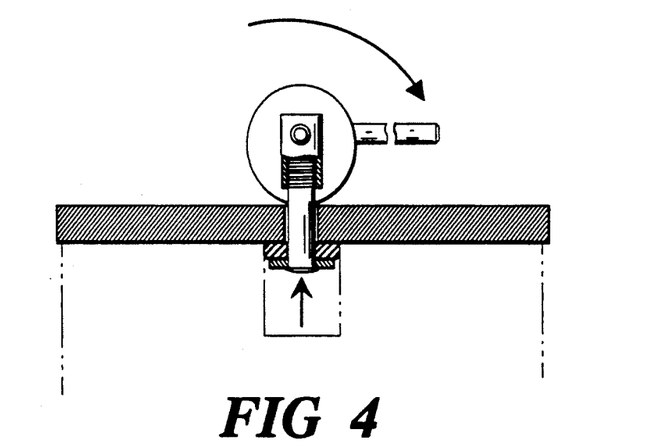
FIG. 4 is a view similar to that shown in FIG. 3, except that the template positioning jig is shown in an engaged position.

In short summary, referring generally to FIGS. 1-5, the template positioning jig 10 operates as follows: the jig 10 is positioned atop a typical member 12 having an elongate channel 14, such that the deformable member 22 being generally rectangular and elongate in form is positioned within and along channel 16. At this time the relative positioning of the two members 10, 12 is as shown in FIGS. 1 and 3. The lever 34 of the template positioning jig 10 is then operated as shown in FIG. 4, wherein the lever is pivoted as indicated by arrow "A", thus operating cam 32, and compression members 22 are drawn upwardly by the camming action of the cam. Compression members 22 urge plate 28 upwardly, such that deformable member 24 is sandwiched between members 20, 28 and deformed inwardly along a substantially vertical axis. This vertical inward deformation results in sideward outward deformation of the deformable member 24, such that its sides contact the inside cofacing sides 16 defined by member 12 as shown in FIG. 4. This outward deformation tends to center and align the deformable member 24 within the channel 14, likewise tending to position the template 10 as desired. The lever 34 is then left in the actuated position shown in FIG. 4, and drilling in desired locations may be provided by inserting a typical drill bit (not shown) through typical drill guide bores 21 defined by template 20. After drilling and other necessary fabrication is complete, the handle 34 is retracted from its engaged position to its disengaged position, and may then be withdrawn from the member 12 to be used again in a similar manner with the same or a different channel member.

A more detailed discussion of the construction and operation of the template positioning jig is now provided. Referring again generally to FIGS. 1-5, the template 20 is substantially plate-like in configuration, and includes an upper primary planar surface 18 and a lower primary planar surface 19 substantially parallel to the upper primary planar surface. Drill guide bores 21 are typical, extend completely through the template 20, and have their bore axes substantially normal to the upper and lower primary planar surfaces of the template 20, although other orientations of the bore axes are contemplated under this invention. Although the use of a hardened plate is preferred, the drill guide bores 21 may optionally be defined by hardened collars, such as those known in the art, which may be press fit into corresponding holes defined by the template 20. In the preferred embodiment shown in FIG. 1, the template 20 is constructed of cold rolled steel, with hardening provided as necessary and as known in the art.

Compression members 22 each include a head 23 (see FIGS. 2, 3) and a body 27. In the first preferred embodiment shown in FIG. 1, compression members 22 are typical hexagon socket machine screws.

Figure 5:
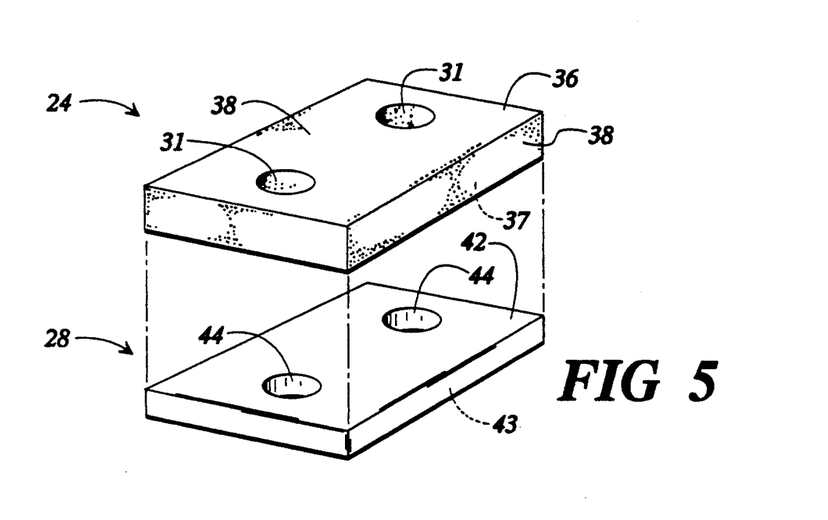
FIG. 5 is an isolated, exploded view of the deformable member and pressure plate member of the embodiment of the invention shown in FIGS. 1-4.

Referring to FIG. 5, deformable member 24 is plate-like in configuration, having upper and lower substantially parallel primary planar surfaces 36, 37, respectively, and having surfaces 38, each being substantially perpendicular to surfaces 36, 37 and hereinafter referred to as "free" side surfaces 38 for reasons apparent below. Deformable member 24 is made of a deformable material, which in the first preferred embodiment is an elastomeric rubber material such a that identified in the trade as "EDPM 80 Durometer".

Plate 28 defines substantially parallel and upper and lower planar surfaces 42, 43, respectively. Plate 28 likewise defines two holes 44, similar in orientation and spacing as holes 31 of deformable member 24. Plate 28 of the first preferred embodiment is made of zinc plated cold rolled steel.

Referring now generally to FIGS. 1-5, when the template positioning jig 10 is assembled, the elongate shafts 27 of each of the two compression members 22 extend through corresponding holes 44 of the plate 28, and likewise extend through corresponding holes 31 defined by the deformable member 24, such that the lower planar surface 37 of the deformable member 24 is in planar contact with the upper planar surface 42 defined by plate 28, and a portion of the lower planar surface 43 of plate 28 is in planar contact with the shoulders defined by the heads 23 of the compression members 22. The shafts 27 of the compression members 22 likewise extend through corresponding holes 17 (see FIG. 3) defined by the template 20. These holes 17 extend completely through the template 20 such that the bore axes of the holes are substantially parallel and normal to the upper and lower primary planar surfaces of the template 20. It may be seen that holes 17, 31, 44 of members 20, 24, 28, respectively, tend to be aligned when the compression members 22 extend through the holes.

The threaded ends of the compression members 22, being upwardly directed in the orientation shown in the figures, threadably engage corresponding longitudinal threaded bores defined by each of the two sleeve connectors 26, as shown in FIGS. 3, 4. As shown in FIG. 3, set screws 40 are provided to provide a locking feature between the compression members 22 and their corresponding sleeve connectors 26, as known in the art.

As shown in FIGS. 1 and 3, the sleeve connectors 26, when attached to their respective compression members 22, have substantially vertical and coparallel longitudinal bore axes. As shown in FIG. 3, the compression members 22 only partially extend into the threaded bores of the sleeve connectors 26, thus providing clearance for an elongate substantially cylindrical pivot pin 30 to extend through matingly configured holes defined by the sleeve connectors, such that the longitudinal axis of the pivot pin 30 is substantially horizontal in the orientation shown in the figures, and substantially perpendicular to the longitudinal axis of each of the shafts 27 of the compression members 22. When in its assembled position, the ends of the pivot pin 30 fit within the sleeve connectors 26, such that the pivot pin 30 may rotate about its longitudinal axis relative to the sleeve connectors 26 and the compression members 22.

In the preferred embodiments, the sleeve connectors 26 are fabricated from zinc plated steel. The pivot pin 30 is preferably made of alloy steel.

Cam member 32 is rigidly affixed by means known in the art to the pivot pin 30, at approximately the center position of the pivot pin, such that the cam is positioned intermediate to the two sleeve connectors 26. A handle member 34 is rigidly affixed to cam member 32 by means known in the art. In the preferred embodiments, the handle 34 has its lower end threadably engaged with the cam member 32 through a corresponding threaded bore which connects with and is perpendicularly positioned relative to the bore which accepts the pivot pin 30. The threaded end of the handle 34 "locks" against the circumferential surface of the pivot pin 30, pursuant to rotation of the handle 34 until the tip of its threaded end bears against the pivot pin 30.

The cam 32 is essentially disk-like in shape, and, in the preferred embodiments, is substantially circular, for ease of fabrication, having a circumferential cam surface 33 and two opposing substantially a parallel planar side surfaces. As discussed above, the pivot pin 30 is rigidly affixed to the cam 32, such that the longitudinal axis of the pivot pin 30 is substantially normal to each of the planar surfaces of the cam 32. Therefore, it may be understood that the cam 32, just as the pivot pin 30, is free to rotate about the longitudinal axis of the pivot pin 30 relative to the sleeve connectors 26 and the compression members 22. Although the cam 32 is substantially circular in the preferred embodiments, as shown in FIG. 3, the longitudinal axis of the pivot pin 30 does not extend through the center of the cam 32, but instead has its longitudinal axis along line "P" spaced a distance D from the center axis of the circular-shaped cam along line "C". This spacing allows the cam to provide its "camming" action, as discussed below.

Operation of the template positioning jig 10 according to the present invention is now discussed. The jig 10 is positioned relative to a typical channel member 12 defining a channel 14 itself defining two cofacing sides 16, such that the deformable member 24 is positioned within the channel 14, with each of its free sides 38 facing and closely positioned relative to one of the cofacing sides 16. At this time the relative positioning of the jig 10 and the member 12 is as shown in FIG. 1. The template positioning jig 10 may be understood as now being in its "unlocked" position. The jig 10 may now be urged into its locked position by rotating the handle 34 about the longitudinal axis of the pivot pin 30, in a direction generally shown as "A" in FIG. 4. During this action, it may be seen that the cam 32 provides its "camming" action, in that the cam surface 33 slides against the upper planar surface 18 of the template 20, such that the cam tends to urge the pivot pin 30 and attached sleeve connectors 26 and compression members 22 upwardly along an axis substantially parallel to the longitudinal axes of the shafts 27 of the compression members 22. It may be seen that this is the only direction in which the pivot pin 30, sleeve connectors 26, and compression members 22 may travel, with acceptable tolerances, as the shafts 27 of the compression members 22 are restricted to movement along that axis due to the nature of the sliding engagement between the shaft 27 of the compression members 22 and the template 20.

As the compression members 22 are drawn upwardly, it may be seen that they provide an upward force against the lower surface 43 of plate 28. Likewise, the plate 28 provides an upward force against the lower planar surface 37 of the deformable member 24. As previously discussed, the lower planar surface 37 of the deformable member 24 is in planar contact with the plate 28, and its upper planar surface 36 is in contact with the lower planar surface 19 of the template 20. Therefore, it may be seen that compression member 24 is effectively captured or "sandwiched" between the plate 28 and the template 20. However, it should also be understood that the free planar side surfaces 38 of the deformable member 24 are relatively unrestricted by either of members 28, 20.

As the compression members 22 are drawn upwardly due to the camming action of the cam 32, it may be seen that the deformable member 24 encounters a force on its upper and its lower horizontal planar surfaces, which tends to deform it such that its free vertical sides 38 tend to bulge outwardly. As the free sides 38 of the deformable member 24 continue to bulge outwardly, eventually one bulging side will contact one of the cofacing sides 16 of the channel member 12. At this time, the deformable member 24 will tend to "center" itself between the cofacing surfaces, by shifting toward the uncontacted cofacing surface 16, such that eventually both bulging sides of the deformable member are in contact with a corresponding cofacing surface and preferably are extending substantially equal amounts of horizontal force against the sides of the channel member. As the lever 34 continues to be urged along path "A", the deformable member will eventually be positioned similar to that shown in FIG. 4. At this time, the deformable member will preferably be "centered", within acceptable tolerances, between the two cofacing surfaces 16 of the channel member 12.

It may be understood that such a centering function is accomplished for channel members having a range of channel widths. This is an important feature of the invention, as channel members manufactured under relatively low tolerance requirements may be fabricated by use of the jig. It should also be understood that a second positioning function will have been performed besides the centering function; the deformable member will also have "aligned" itself along with the longitudinal axis of the channel 14, as the elongate free side surfaces will be preferably in full contact with the cofacing sides 16 defining the channel.

As sideward motion of the deformable member 24 relative to the template 20 is restricted by the presence of frictional forces between the members 24, 20 and also by the tendency of compression members 22 to maintain holes 31, 17 of the members 24, 10 in alignment, it should also be understood that the template will tend to move sidewardly along with the deformable member, with its lower planar surface 19 sliding across the top of channel member 12. Therefore it may be seen that as deformable member is positioned as desired relative to channel 14, so is template 20 positioned as desired relative to channel 14.

Once the template 20 is in its desired position, drilling may be initiated as known in the art by use of the typical drill guides 21. The cam remains locked in its "engaged" position by means of friction between cam surface 33 and upper surface 18 of template 20.

It should be understood that although the preferred embodiment is configured to position the deformable member 24 at a "centered" position, within acceptable tolerances, other configurations may be used which, although not providing a "centering" function, nonetheless provide desired positioning of the template relative to a typical channel member 12. Such alternate configurations would still be capable of consistent desired positioning relative to channel members 12, throughout repeated operation.

After drilling or other desired fabrication is complete, the jig 10 may be "disengaged" back to its position shown in FIG. 1, and may be slid along channel 14 to another position along the same channel member 12, or may be withdrawn from channel member 12 for engagement with another similar channel member.

Figure 7:
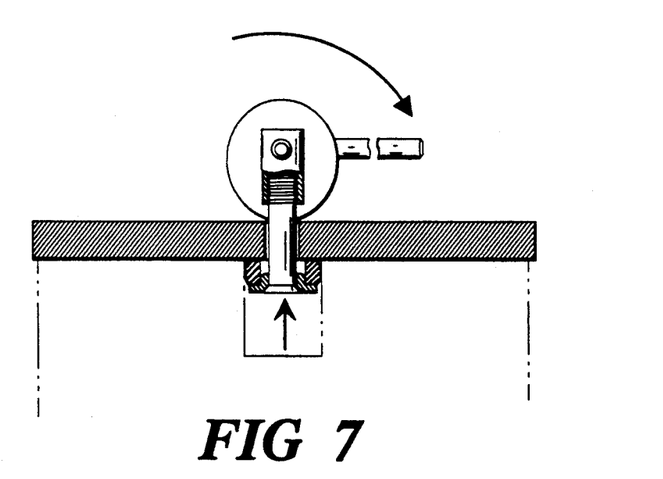
FIG. 7 is a view similar to that shown in FIG. 6, except that the jig is shown in an engaged position.
Figure 8:
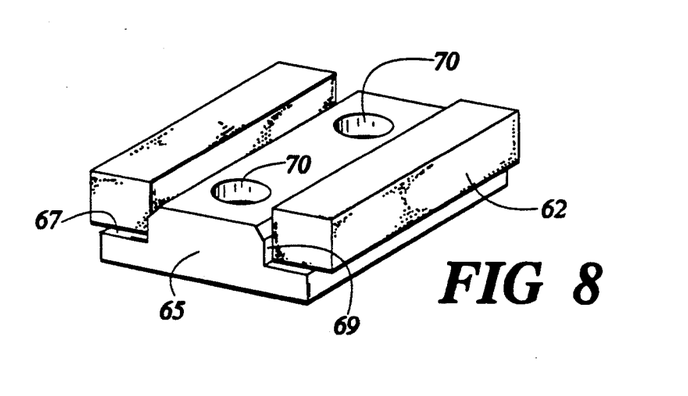
FIG. 8 is an isolated exploded view of a pressure block and two deformable pads used in the jig shown in FIGS. 6 and 7.

FIGS. 6–8 show a second preferred embodiment of the present invention, which is configured to be used with channel members 12 with channels 14 having a greater width-to-depth ratio than that shown in FIGS. 1, 3 and 4. Generally described, the second preferred embodiment of the invention, identified as template positioning jig 60, does not include a single deformable member, or a plate, but instead includes two similarly-shaped deformable pads 62 and a pressure block 65. Referring to FIG. 8, pressure block 65 defines two substantially coplanar horizontal surfaces 67, two vertical opposing surfaces 69, and two holes 70, having substantially vertical and parallel axes similar in orientation to the holes described in conjunction with previously-discussed elements 24, 28. The pressure block 65 is substantially symmetrical about an axis passing through the center axes of holes 70.

Referring generally to FIGS. 6–8, when the template positioning jig 60 is assembled, compression members 72 extend through corresponding bores 70 of pressure block 65, in a manner similar to the interaction of the compression members 22 and pressure plate 28 of previously-discussed jig 10. However, it should be understood that compression members 72 have heads configured to fit flush within the pressure block due to their countersunk configuration.

Contact between the deformable pads 62 and the pressure block 65 is maintained by means of double-sided pressure tape, gluing, or means known in the art.

When the jig 60 is assembled, it may be seen, upon review of FIG. 6, that the lower horizontal planar surfaces of each of the deformable pads 62 are at least in partial contact with a corresponding one of horizontal surfaces 67 defined by pressure block 65. The deformable pads 62 are also in contact with vertical surfaces 69 of pressure block 65, such that it may be said that the deformable pads are "nestled" in a corner defined by a horizontal surface 67 cooperating with a corresponding vertical surface 69. The upper planar surfaces of the pads 62 are in planar contact with the lower primary planar surface of template 20.

Operation of jig 60 is similar to operation of previously discussed jig 10; the operating handle 34 is actuated such that cam 32 initiates its camming action, thus drawing compression members 72 upwardly. As the compression members 72 are urged upwardly along their longitudinal axes, they urge pressure block 65 in a similar direction. As pressure block 65 is urged upwardly toward template 20, the pressure pads 62, captured between the two members 20, 65, are deformed along a vertical direction. As the "interior" vertical sides of the pressure pads 62 are at least partially restrained by vertical surfaces 69 of the pressure block 65, the pads 62 tend to bulge mostly outwardly, as shown in FIG. 7, toward a corresponding cofacing surface 116 of the channel 114 of member 112. As the handle 34 is urged toward its locked position, again the desired "centering" function is formed, such that the pressure block tends to be centered, within acceptable tolerances, within the channel 114. As the pressure block is relatively positioned, so is the jig 60.

Once the jig 60 is in its engaged position, drilling operations may be initiated as previously discussed. Disengagement is opposite to engagement.

Figure 9:
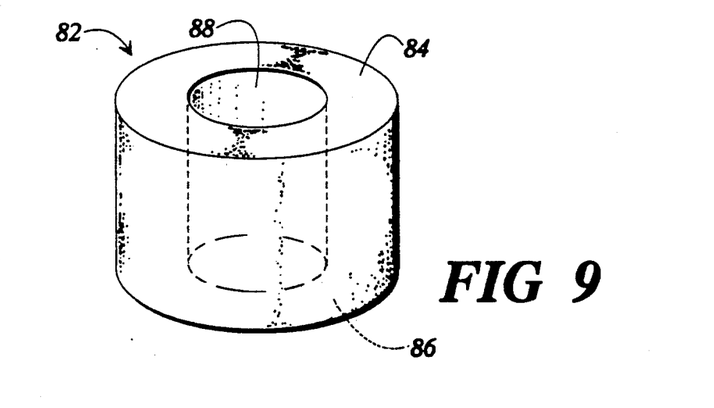
FIG. 9 is an isolated perspective view of a deformable member adapted for use with a third embodiment of the invention shown in FIGS. 10 and 11.
Figure 10:
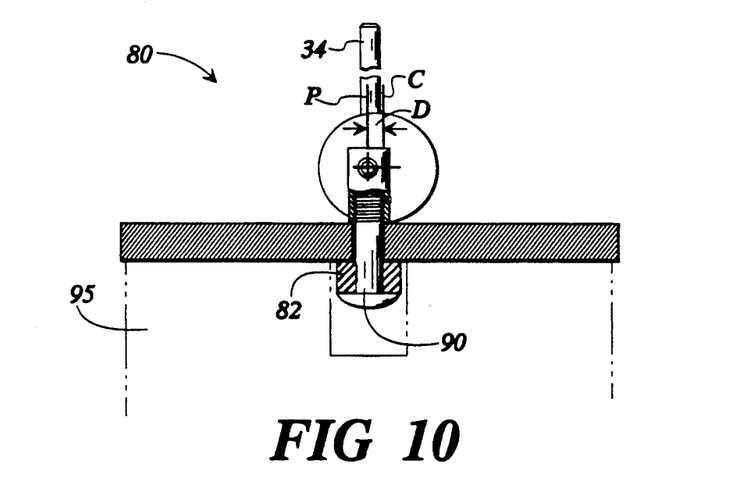
FIG. 10 is a side partial cutaway view of a third embodiment of template positioning jig according to the present invention, with the jig shown in a disengaged position atop a typical channel member, shown in phantom.
Figure 11:
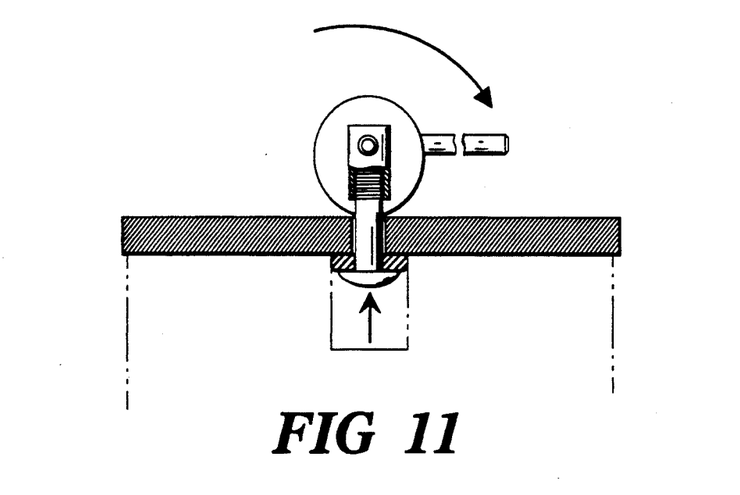
FIG. 11 is a view similar to FIG. 10, except that the jig is shown in an engaged position.

Other embodiments are contemplated under the present invention. Referring to FIG. 9, two deformable members identified as deformable collars 82 may be used in a third embodiment of the invention shown in FIGS. 10, 11 identified as jig 80. Each of the deformable collars 82 defines upper and lower planar surfaces 84, 86, respectively, and also includes a central bore 88. As shown in FIGS. 10, 11 each collar 82 fits around the shaft of a corresponding compression member 90. Operation of jig 80 is similar to previously-discussed jigs 10, 60 and it may be seen that each collar 82 deforms radially to contact the sides of the typical channel member 95.

It should be understood that the jigs embodying the present invention are particularly adaptable for use in fabricating channel members known as "mullions" which may be used in fabricating "curtainwall" constructions, familiar to those in the commercial window and door framing industry. Many mullions define channels, and it is often desired to drill holes spaced a desired distance relative to the center of the channels, in order to insert fasteners as known in the art. The present invention facilitates easy drilling of such holes relative to such centers, even if the widths of the channels vary somewhat in width.

Thus, it may be seen that the present invention provides an effective, inexpensive, and reliable template positioning jig. The jig includes deformable members, which may be deformed along a first axis such that they expand a second axis. There are a minimum amount of moving parts, and all parts may be readily replaceable. The jig may be repeatedly locked onto a channel member, such that a template is consistently positioned relative to the cavity of a typical channel. The use of a deformable member is a particular advantage of the present invention, which allows the jig to contact metal parts without marring them, and also allows quick engagement and disengagement of the jig, a particular advantage if the jig is used in an "assembly-line" type of operation.

It should be understood that the foregoing relates only to a preferred embodiment of the present invention, and that numerous modifications or alterations may be made therein without departing from the spirit and scope of the invention as set forth in the appended claims.

What is claimed is:

1. A self-positioning jig for positioning relative to a reference member defining a planar surface of an elongate channel-shaped cavity, said jig comprising;
   a deformable member defining first, second, third, and fourth surface portions;
   means for deforming said deformable member along an axis so said third and fourth surface portions move relatively closer together, such that said deformable member deforms radially relative to said axis so said first and second surface portions move relatively further apart, until one of said first and second surface portions comes in contact with said planar surface of said reference member and said deformable member develops a force against said planar surface of said reference member; and
   a template defining a drill guide bore, in frictional contact relative to said deformable member such that said template is urged through said frictional relationship toward a desired position relative to said reference member when said deformable member contacts said planar surface of said reference member.

2. A self-positioning jig for positioning relative to a reference member defining an elongate channel-shaped cavity at least partially defined by first and second cofacing planar surfaces, said jig comprising;
   a base member defining a base surface and defining a drill guide bore;
   a force exerting member defining a force exerting surface;
   a deformable member including first and second sides and positioned between said base member and said force exerting member, said deformable member being in contact with said base surface and said force exerting surface; and
   means for urging said force member relatively toward said base member along a first axis, when said deformable member is in said cavity, such that said deformable member is deformed radially relative to said first axis and said first and second sides of said deformable member move relatively away from each other and correspondingly contact said first and second cofacing sides of said cavity during deformation of said deformable member, such that corresponding and opposing first and second forces are developed between said deformable member and against said first and second cofacing sides of said reference member, such that any difference in magnitude of said forces tends to urge said deformable member to a position in which said forces have a lesser difference in magnitude.

3. The jig as claimed in claim 2 wherein said base and said deformable member are in frictional contact such that said base is urged along with said deformable member relative to said reference member.

4. The jig as claimed in claim 3, wherin said base surface is substantially parallel to said force exerting surface.

5. The jig as claimed in claim 4, wherein said deformable member is of unitary elestomeric construction.

6. A self-positioning jig for positioning relative to a reference member defining a surface and an elongate channel-shaped cavity defining two cofacing planar sides, comprising;
   a base member defining a base surface and defining a drill guide bore;
   a plate member operably associated with said base, said plate member defining a plate surface facing and substantially parallel to said base surface;
   a deformable member positioned between said base member and said plate member, said deformable member having a first surface in contact with said base member, a second surface opposite said first surface and contacting said plate surface, and two substantially coparallel free opposing surfaces being substantially unrestricted by either of said base or plate members, said free surfaces being substantially perpendicular to said base surface and said plate surface;
   means for urging said plate member relatively toward said base member from a first position to a second relative position along a first axis when said deformable member is in said cavity, such that said free surfaces of said deformable member bulge relatively apart along a second axis substantially perpendicular to said first axis such that said free surfaces each contact and exert a force on a corresponding one of said cavity sides, said second axis extending through each of said cofacing sides; and
   means for releasably locking said plate member into said second position relative to said base member.

7. A self-positioning jig for positioning relative to a reference member defining a substantially horizontal surface and defining an upwardly-directed cavity at least partially defined by two substantially vertical cofacing sides, comprising;
   a base member defining at least two holes and upper and lower horizontal base surfaces, said holes extending through said base member and having substantially coparallel and vertical bore axes, said base member also including a template portion defining at least one drill guide bore;
   a plate member operably associated with said base surface, said plate member defining at least two holes and upper and lower substantially parallel and horizontal surfaces, said holes extending through said plate member and having substantially parallel and vertical bore axes, said first plate surface facing and substantially parallel to said base surface;
   a deformable member positioned between said base member and said plate member, said deformable member having a first horizontal upper surface in contact with said lower surface of said base member, a second horizontal lower surface opposite said first surface and contacting said plate surface, and two substantially coparallel free vertical opposing surfaces being substantially unrestricted by either of said base or plate members, said free surfaces being substantially perpendicular to said base surface and said plate surface, said deformable member also defining two holes having vertical bore axes extending through said deformable member;

two elongate headed members each having a shaft portion having an upper and a lower end and a head portion attached to said upper end, said shaft portions being substantially mutually parallel and extending through one of said holes of said base member, said deformable member, and said plate member, said headed member being in contact with the underside of said second plate surface, and said upper ends of said headed members protruding above said upper surface of said plate member;

sleeve connector means rigidly attached proximate to the upper ends of each of said headed members, each of said sleeve connector means defining vertical bores being mutually coaligned;

pivot pin means having opposing ends each rotatably positioned within one of said vertical bores defined by said sleeve connectors;

cam means rigidly affixed proximate the center of said pivot pin and having a cam surface in contact with said upper surface of said base member, said cam means being configured to provide a camming action such that rotation of said cam causes said cam surface to bear upon said base member, and cause substantially linear translation of said headed members along their longitudinal axes; and means for rotating said cam means such that said deformable member is deformed by the combination of said plate and said plate member.

8. A self-positioning jig for positioning relative to a reference member, said reference member defining an elongate channel-shaped channel having a substantially planar first surface portion and a substantially planar second surface portion, said first and second surface portions of said reference member lying in substantially perpendicular planes, said jig comprising;

a deformable member lying in an axis and defining first, second, third, and fourth surface portions, said first and second surface portions lying in substantially parallel planes each substantially parallel to said axis and parallel to said second surface portion of said reference member;

means for deforming said deformable member so said third and fourth surface portions move relatively closer together and said deformable member deforms to expands radially relative to said axis so said first and second surface portions move relatively further apart until one of said first and second surface portions comes in contact with said second surface and said deformable member develops a force against said second surface of said reference member; and a tool guiding template, defining a drill guide bore, in frictional contact relative to said deformable member and in sliding contact with said first surface of said reference member such that said force urges said deformable member to urge said template to slide along said first surface portion of said reference member.

9. A self-positioning jig for positioning relative to a reference member defining an elongate channel-shaped cavity having a first surface portion, said jig comprising;

a template member defining a drill guide bore;

a force exerting member;

a deformable member lying in a first axis and positioned between said template member and said force exerting member;

means for urging said force member relatively toward said template member along a second axis substantially parallel to said first axis such that said deformable member is squeezed between and is in frictional contact with both said template member and said force exerting member and said deformable member deforms radially relative to said first axis such that a surface portion of said deformable member is in contact with said deformable member and develops a force against said reference member sufficient to cause relative movement between said reference member and said template member.

10. A method of operating a self-positioning jig relative to a reference member defining a channel-shaped cavity having a reference member surface portion, said jig including a tool guiding template defining a drill guide bore said jig also including, a force exerting member, and a deformable member positioned between said tool guiding template and said force exerting member, comprising the steps of:

positioning said jig in sliding contact with said reference member such that an outside surface portion of said deformable member is positioned adjacent to said surface portion of said reference member, squeezing said deformable member between said template and said force exerting member along a first axis to cause said deformable member to expand radially relative to a second axis substantially parallel to said first axis such that said outside surface portion of said deformable member is in contact with said surface portion of said reference member with a force sufficient to cause relative sliding movement between said template member and said reference member; and guiding said tool with the aid of said tool guiding template in order to fabricate said reference member with said tool, while said deformable member is in said squeezed state.

11. A self-positioning jig for positioning relative to a reference member, said reference member defining a substantially elongate channel-shaped cavity having first and second cofacing side walls, said first side wall including a substantially planar elongate wall portion, said jig comprising;

a template member defining a tool guiding means;

a force exerting member;

an elongate deformable member positioned between said template member and said force exerting member and defining an elongate surface portion; and means for urging said force member relatively toward said template member such that said deformable member is squeezed between and is in frictional contact relative to said template member and said force exerting member and said deformable member deforms such that an elongate surface portion of said deformable member is in contact with said elongate portion of said first side wall of said reference member and develops a force against said reference member sufficient to cause relative movement between said reference member and said template member and sufficient to cause alignment of said reference member relative to said template member.

12. A method of operating a self-positioning jig relative to a reference member defining channel-shaped cavity having a reference member surface portion, said jig including a tool guiding template defining a drill guide bore, said jig also including a force exerting member and a deformable member positioned between said tool guiding template and said force exerting member, comprising the steps:
- positioning said jig in sliding contact with said reference member such that an outside surface portion of said deformable member is positioned adjacent to said surface portion of said reference member,
- squeezing said deformable member between said template and said force exerting member along a first axis to cause said deformable member to expand radially relative to a second axis substantially parallel to said first axis such that a surface portion of said deformable member is in contact with said surface portion of said reference member with a force sufficient to cause relative sliding movement between said template member and said reference member; and
- drilling said reference member with the aid of said drill guide bore while said deformable member is in said squeezed state.

13. A self-positioning jig for positioning relative to a reference member, said reference member defining a substantially elongate channel-shaped cavity having a longitudinal channel axis and defining first and second cofacing side walls, said first side wall including a substantially planar elongate wall portion, said jig comprising;
- a template member defining a drill guide bore;
- a force exerting member;
- an elongate deformable member having a longitudinal axis and positioned between said template member and said force exerting member and defining an elongate surface portion; and
- means for urging said force member relatively toward said template member such that said deformable member is squeezed between and is in frictional contact with said template member and said force exerting member, and said deformable member deforms such that said elongate surface portion of said deformable member is in contact with said elongate portion of said first side wall of said reference member and develops a force sufficient to cause relative movement between said reference member and said template member and sufficient to encourage parallel alignment of said longitudinal axis of said deformable member relative to said longitudinal channel axis.

14. A self-positioning jig for positioning relative to a reference member, said reference member defining a substantially elongate channel having a longitudinal channel axis and defining first and second cofacing side walls, said jig comprising:
- a template member including a drill guide bore;
- a force exerting member;
- a first deformable member positioned between said template member and a first force exerting member and defining a first surface portion;
- a second deformable member positioned between said template member and a second force exerting member and defining a second surface portion; and
- means for urging said first and second members relatively toward said template member such that said first and second deformable members are squeezed between and are in frictional contact with to said template member and said force exerting members, and said first and second deformable members deform such that said first and second surface portions are in contact with said first side wall of said reference member and combine to develop a force against said reference member sufficient to cause relative movement between said reference member and said template member and sufficient to cause alignment of said template member relative to said longitudinal axis of said reference member.

15. A self-positioning jig for positioning relative to a reference member defining a substantially horizontal surface and defining an upwardly-directed channel-shaped cavity at least partially defined by two substantially vertical cofacing sides, comprising;
- a base member defining at least two holes and upper and lower horizontal base surfaces, said holes extending through said base member and having substantially coparallel and vertical bore axes, said base member also including a template portion defining at least one drill guide bore;
- a plate member operably associated with said base surface, said plate member defining at least two holes and upper and lower substantially parallel and horizontal surfaces, said holes extending through said plate member and having substantially parallel and vertical bore axes, said first plate surface facing and substantially parallel to said base surface;
- a first deformable member positioned between said base member and said plate member and defining a first surface portion;
- a second deformable member also positioned between said base member and said plate member and defining a first surface portion;
- two elongate headed members each having a shaft portion having an upper and a lower end and a head portion attached to said upper end, said shaft portions being substantially mutually parallel and extending through one of said holes of said base member, said deformable member, and said plate member, said headed member being in contact with the underside of said second plate surface, and said upper ends of said headed members protruding above said upper surface of said plate member;
- sleeve connector means rigidly attached proximate to the upper ends of each of said headed members, each of said sleeve connector means defining vertical bores being mutually coaligned;
- pivot pin means having opposing ends each rotatably positioned within one of said vertical bores defined by said sleeve connectors;
- cam means rigidly affixed proximate the center of said pivot pin and having a cam surface in contact with said upper surface of said base member, said cam means being configured to provide a camming action such that rotation of said cam causes said cam surface to bear upon said base member, and cause substantially linear translation of said headed members along their longitudinal axes; and
- means for rotating said cam means such that said first and deformable members are deformed by the combination of said plate and said plate member and each deformable member contacts one of said cofacing sides of said channel-shaped cavity.

* * * * *